United States Patent
Okumura

(10) Patent No.: US 6,714,719 B1
(45) Date of Patent: Mar. 30, 2004

(54) VIDEO RECORDING SYSTEM USING MAGNETIC DISK DRIVE

(75) Inventor: Toshiyuki Okumura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/438,951

(22) Filed: Nov. 12, 1999

(30) Foreign Application Priority Data

Nov. 12, 1998 (JP) .......................................... 10-322666

(51) Int. Cl.⁷ ................................................. H04N 5/91
(52) U.S. Cl. ............................. 386/46; 386/83; 386/95; 386/125; 714/710; 360/77.04
(58) Field of Search .......................... 386/46, 125–126, 386/117, 83, 95, 124; 360/77.04; 714/710, 8; H04N 5/91

(56) References Cited

U.S. PATENT DOCUMENTS

| | | | | | |
|---|---|---|---|---|---|
| 4,122,503 | A | * | 10/1978 | Allan | ....................... 360/78.05 |
| 4,525,839 | A | * | 7/1985 | Nozawa et al. | ............. 714/710 |
| 5,278,838 | A | * | 1/1994 | Ng et al. | ........................ 714/6 |
| 5,424,885 | A | * | 6/1995 | McKenzie et al. | ........ 360/77.04 |
| 6,226,444 | B1 | * | 5/2001 | Goldschmidt Iki et al. | ... 386/46 |

FOREIGN PATENT DOCUMENTS

| | | |
|---|---|---|
| JP | 7-307061 | 11/1995 |
| JP | 8-76933 | 3/1996 |
| JP | 10-49312 | 2/1998 |
| JP | 10-244665 | 3/2000 |

* cited by examiner

*Primary Examiner*—Vincent Boccio
(74) *Attorney, Agent, or Firm*—Young & Thompson

(57) ABSTRACT

A video recording/reproduction system is equipped with a magnetic disk drive, which records and reproduces video data on a magnetic disk by driving a magnetic head. Herein, the magnetic disk drive is controlled by a CPU in accordance with control programs, while a host machine is provided to perform a variety of controls regarding recording and reproduction in accordance with commands being given by manipulation of an operation panel. The magnetic disk drive is characterized by performing a reassignment process and/or calibration such as to suppress reduction of throughput of video data. That is, if the CPU fails to access a target sector of the magnetic disk so that the target sector is regarded as a defect sector, the CPU makes a decision whether to perform the reassignment process based on transfer speeds and vacant capacity of a buffer memory built in the magnetic disk drive. If transferring data of the host machine overflow the buffer memory by execution of the reassignment process, the CPU temporarily refuges the data to a storage, then, after completion of recording or reproduction, the CPU performs the reassignment process again. Further, the magnetic disk drive performs calibration only when a time margin between a present time and a start time of reserved recording is greater that a calibration time. Thus, it is possible to avoid occurrence of breaks by which pictures being recorded or reproduced are interrupted intermittently. So, it is possible to improve reliability and picture quality in recording and reproduction.

10 Claims, 5 Drawing Sheets

VIDEO RECORDING SYSTEM USING MAGNETIC DISK DRIVE

BACKGROUND OF THE INVENTION

1. Field of the Invention

This invention relates to magnetic disk drives that read and write data on magnetic disks in response to commands given from host systems. Particularly, this invention relates to video recording/reproduction systems that use the magnetic disk drives to perform video recording and reproduction under control of the host systems.

This application is based on Patent Application No. Hei 10-322666 filed in Japan, the content of which is incorporated herein by reference.

2. Description of the Related Art

A variety of papers disclose the technologies regarding the magnetic disk drives and video recording/reproduction systems, as follows:

For example, Japanese Patent Application, First Publication No. Hei 10-49312 discloses a magnetic disk drive, which uses a nonvolatile memory to speed up the processing, regarding recording and reproduction of data on magnetic recording media, by eliminating an access time for an access to an alternative sector address which is physically discontinuous.

Japanese Patent Application, First Publication No. Hei 7-307061 discloses a recording and reproducing device, which is designed to reduce recording time and reproducing time even if a disk contains a defective sector by accessing its alternative sector within a solid memory.

Japanese Patent Application, First Publication No. Hei 8-76933 discloses an example of a format operation controller, in which an alternative sector process and/or defective sector mapping is performed with respect to a defective sector detected on a new hard disk to record picture data.

In the magnetic disk drives, magnetic heads perform magnetization on magnetic layers corresponding to surfaces of magnetic disks, which rotate at high speed. Thus, the magnetic disk drives are capable of recording and reproducing desired data on the magnetic disks. Normally, the magnetic heads fly over the magnetic disks, which rotate at high speed, by some gaps to read and write data without making contact with the disk surfaces. Recently, the gaps by which the magnetic heads fly over the rotating magnetic disks are reduced to cope with increases in capacities and recording densities of the magnetic disk drives. Such reduction of the gaps makes the magnetic heads to easily come in contact with the disk surfaces. When magnetoresistance effect components are used for reproduction heads, disturbances are introduced into reproduction waveforms due to so-called "thermal asperity", which correspond to rapid temperature variations of the components being caused by contacts between the heads and disks. For this reason, it is required to reduce roughness of the disk surfaces and disturbance (or partial defectiveness) of the magnetic layers more strictly.

However, it is almost impossible to perfectly eliminate defects of the disks in manufacture. So, manufacturers make the magnetic disk drives in consideration of the defects of the disks to some extent. In order to use the disks having such defects without troubles, the magnetic disk drives are generally designed to effect defect repair processes, which are called "reassignment processes (or alternate processes)", when detecting defects of the disks. According to the reassignment process, the magnetic disk drive recognizes an area (i.e., sector), on which a recording/reproduction process cannot be performed normally due to existence of a defect, as a defect sector. Specifically, the magnetic disk drive stops using such a defect sector by recording data representative of existence of the defect in a header portion (i.e., ID portion) of the defect sector. Herein, an alternate sector region is prepared in advance for replacement of the defect sector on a same track of the defect sector or within a zone containing the defect sector. From such an alternate sector region, the magnetic disk drive determines and assigns an alternate destination sector. In addition, the magnetic disk drive stores information representative of a location of the defect sector to the magnetic disk or a prescribed memory provided inside thereof. Thus, the magnetic disk drive controls such that access to the defect sector is changed over to access to the alternate destination sector of the alternate sector region.

Enlargement of capacities of the magnetic disk drives is achieved mainly by reduction of record bit lengths as well as by increase of record track densities. High track densities inevitably require servo control techniques for accurate positioning of heads on desired track positions. Particularly, in order to cope with environmental variations in temperature and humidity as well as mechanical variations when the magnetic disk drives operate for a long time, it is necessary to perform calibration of servo control system every prescribed time with respect to the magnetic disks of high track densities. There are provided a variety of examples for the calibration, as follows:

i) Circuit/HDA calibration for performing corrections specifically with respect to circuit boards and head disk assembly (HDA);

ii) Calibration (head sensitivity correction) for accuracy of positional error signals;

iii) Disk eccentric calibration;

iv) Calibration (current/acceleration reduced gain) for voice coil motor (VCM) control system that drives a head arm to move to a predetermined position; and v) Calibration for external forces such as wind pressure being applied to the head arm or flexible printed-circuit board (FPC).

The aforementioned reassignment process and calibration process are performed in factory shipment inspection, which is made just before shipment of products corresponding to the magnetic disk drives, or when the users start to operate the magnetic disk drives. As for the circuit/HDA calibration, data are measured in the factory shipment inspection and are recorded on a memory such as a ROM provided in the magnetic disk drive. Such data can be used for corrections of the magnetic disk drive after the shipment. In contrast, the reassignment process is effected with respect to the defect sector which occurs after the shipment, while time-related variations (e.g., temperature variations) may be included in the disk eccentric calibration and VCM control system calibration after the shipment. So, they must be performed after the shipment or when the user starts to operate the magnetic disk drive.

Video recording/reproduction systems conventionally use the aforementioned magnetic disk drives for recording and reproduction of video information on the magnetic disks. However, the conventional video recording/reproduction system using the magnetic disk drive suffers from a variety of problems as follows:

i) A first problem is that the system badly records and reproduces video images which may be interrupted intermittently due to the reassignment process and calibration, so the magnetic disk drive is damaged in reliability while picture quality of display is damaged. Because, when the reassignment process is performed due to occurrence of the defect sector in the magnetic disk storing the video data having continuity or when the calibration is performed at certain intervals of time while the magnetic disk drive is operating to read or write video data having continuity, such continuity of the video data must be interrupted (intermittently).

ii) A second problem is that when the user starts video recording at an arbitrary time, the video recording cannot be started instantaneously, so some part of vido images must be broken without being recorded on the disk. Because, in some cases, the magnetic disk drive performs the calibration at the timing when the host machine issues a record start instruction. At that time, the magnetic disk drive is occupied in calibration, so the system cannot execute the record start instruction immediately.

SUMMARY OF THE INVENTION

It is an object of the invention to provide a video recording/reproduction system using a magnetic disk drive, which is improved in reliability by controlling a reassignment process and calibration in such a way that recording and reproducing operations are adequately performed with respect to video data having continuity to suppress occurrence of breaks in video images.

A video recording/reproduction system of this invention is equipped with a magnetic disk drive, which records and reproduces video data on a magnetic disk by driving a magnetic head. Herein, the magnetic disk drive is controlled by a CPU in accordance with control programs, while a host machine is equipped with an antenna, a tuner, a monitor and a timer to perform a variety of controls regarding recording and reproduction with respect to the magnetic disk drive in accordance with commands being given from an operation panel which is manipulated by a human operator.

At a recording mode, the host machine controls the magnetic disk drive to record a broadcast program, being selected by the tuner, on the magnetic disk. At a reproduction mode, the host machine controls the magnetic disk drive to reproduce data from the magnetic disk so that the monitor displays pictures corresponding to the reproduced data on a screen.

In an access failure state where the CPU fails to access a target sector of the magnetic disk so that the target sector is regarded as a defect sector, the magnetic disk drive performs a reassignment process, in which an alternate sector is assigned as alternate destination for the defect sector to perform recording or reproduction. Herein, a decision whether to perform the reassignment process is made based on a maximum transfer speed of the magnetic disk drive, a data transfer speed by which data are transferred between the host machine and magnetic disk drive, and vacant capacity of a buffer memory built in the magnetic disk drive. Specifically, the vacant capacity is divided by a difference between the maximum transfer speed and data transfer speed to produce a first time, which is compared with a second time required for execution of the reassignment process. If the first time is greater than the second time, the CPU determines to perform the reassignment process. If the first time is under the second time so that data being transferred from the host machine may overflow the buffer memory by execution of the reassignment process, the CPU temporarily refuges the data to a storage, then, after completion of recording or reproduction, the CPU performs the reassignment process so that the data are recorded or reproduced on the alternate sector of the magnetic disk. Incidentally, the CPU determines the alternate sector with reference to an alternate sector using condition table for storing a plurality of alternate sectors which are selected in advance and each of which is assigned as alternate destination for the defect sector, while the CPU makes a decision whether to access the alternate sector because the target sector corresponds to the defect sector with reference to an alternate destination assignment condition table for storing relationship between position information of the defect sector and position information of the alternate sector being assigned.

Further, the magnetic disk drive performs calibration with respect to the magnetic disk only when a time margin between a present time measured by the timer and a start time of reserved recording in which the host machine stores a reservation time for recording of a broadcast program is greater than a calibration time required for execution of the calibration.

Thus, it is possible to suppress reduction of the transfer speed, in other words, reduction of throughput of video data due to execution of the reassignment process and calibration. In addition, it is possible to avoid occurrence of breaks by which pictures being recorded or reproduced are interrupted intermittently. So, it is possible to improve reliability in performance and operation of the magnetic disk drive as well as picture quality in recording and reproduction.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
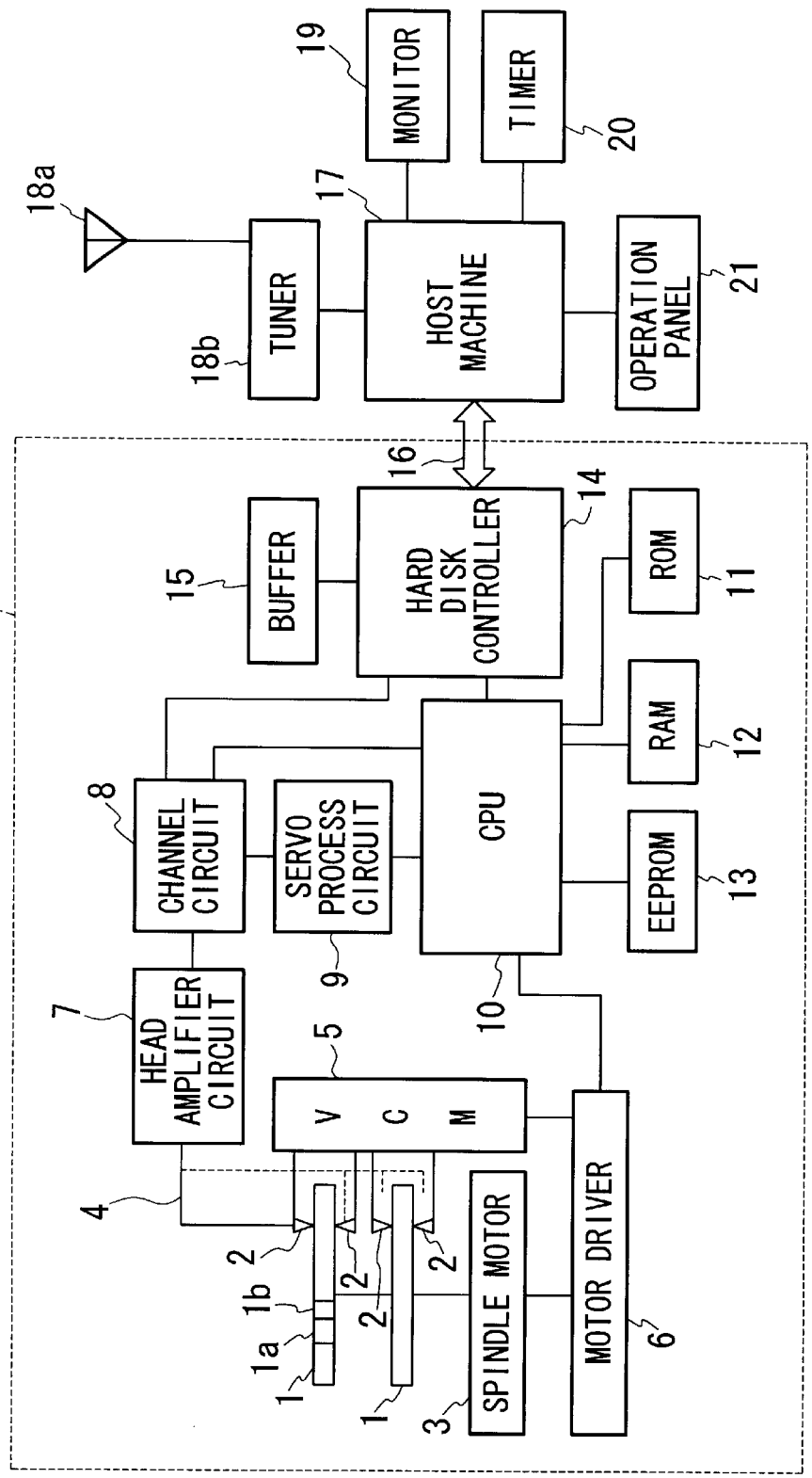
FIG. 1 is a block diagram showing an overall configuration of a video recording/reproduction system which uses a magnetic disk drive in accordance with embodiment of the invention.

FIG. 1 is a block diagram showing an overall configuration of a video recording/reproduction system using a magnetic disk drive in accordance with embodiment of the invention. The video recording/reproduction system is equipped with a magnetic disk drive 100, which drives a magnetic disk 1 with a magnetic head 2. Herein, the magnetic head 2 is used to record and reproduce data on the magnetic disk 1, which is an example of a recording medium for recording data. Actually, the magnetic disk 2 consists of a stack of disks (e.g., two disks), which are piled up on a common spindle. So, the magnetic heads 2 are used to read and write data on the disks 1 respectively. For convenience' sake, the following description basically refers to a single magnetic disk 1, on which data are read and written by a single magnetic head 2. A spindle motor 3 drives the spindle so that the magnetic disk 1 rotates at high speed.

The magnetic head 2 is attached to a head movement mechanism, which is called a carriage "4". So, the magnetic head 2 moves in a radius direction of the magnetic disk 1 in response to rotary motion of the carriage 4.

The carriage 4 is driven by a voice coil motor (VCM) 5.

A number of record tracks are formed concentrically on both sides of the magnetic disk 1. Multiple servo regions are arranged on each track at equal intervals of distance. The servo regions record servo data used for positioning control of the magnetic head 2.

The servo regions are arranged in a radial manner on the magnetic disk 1 to spread from the center of the disk across the tracks. A user area lies between serve regions. Multiple data sectors are set to the user area. Based on reproduced signals from the servo regions, the magnetic head 2 is subjected to positioning control to be positioned on a target record track, which is designated by a servo processing system, i.e., head positioning control mechanism, details of which will be discussed later. Normally, the magnetic head 2 records and reproduces data by the unit of sector.

A predetermined area or a record track on each side of the magnetic disk 1 stores defect information (1a, 1b) regarding defects of the magnetic disk 1 in addition to a variety of data. There are provided two kinds of the defect information 1a, 1b. That is, the defect information 1a is registered in advance by the manufacturer before shipment of the magnetic disk, while the defect information 1b is detected during operation of the magnetic disk drive 100 and is managed by a host machine 17. Incidentally, the defects registered by the defect information 1a, 1b have been already subjected to reassignment processes.

The defect information 1a, 1b store an alternate sector using condition table and an alternate destination assignment condition table with respect to all alternate sectors, which are provided on the magnetic disk 1 in advance. Herein, alternate sector using condition table stores indication as to whether the alternate sector has been already assigned as alternate destination for the defect sector or not. The alternate destination assignment condition table stores a relationship between position information (representing head, cylinder and sector number) of the defect sector and position information of the alternate sector, which is assigned as the alternate destination for the defect sector. Incidentally, the defect information 1a, 1b can be stored in a rewritable nonvolatile storage device such as an EEPROM (i.e., Electrically Erasable Programmable Read-Only Memory) 13 other than the magnetic disk 1.

The spindle motor 3 and the voice coil motor 5 are connected to a motor driver 6.

The motor driver 6 supplies a control current to drive the spindle motor 3 while supplying a control current to drive the voice coil motor 5. A control current value (i.e., amount of control) is determined by calculations which a CPU (i.e, Central Processing Unit) or a microprocessor "10" performs based on reproduced signals from the servo regions recorded on the magnetic disk 1.

All of the magnetic heads 2 are connected to a head amplifier circuit 7, which is installed on a flexible printed-circuit board (FPC), for example.

The head amplifier circuit 2 performs switching control on the magnetic heads 2 to be switched over while performing input/output control on recording signals and reproduced signals of the magnetic heads 2. Actually, the head amplifier circuit 2 has a function to amplify the reproduced signals, which the magnetic heads 2 reproduce from the magnetic disks 1. In addition, the head amplifier circuit 7 has a record driver (not shown) which outputs a record current to the magnetic head 2 in accordance with record data given from a channel circuit 8.

The magnetic head 2 reads and reproduces signals of the magnetic disk 1 to output reproduced signals to the head amplifier circuit 7, in which they are amplified. Then, an output of the head amplifier circuit 7 is input to a channel circuit (i.e., read-write channel IC) 8. The channel circuit 8 has three functions, i.e., a decode function, an encode function and a signal processing function. In the decode function, the channel circuit 8 performs signal processing, which is required for reproduction of data. In the encode function, the channel circuit 8 performs signal processing, which is required for recording of data onto the magnetic disk 1. In the signal processing function, the channel circuit 8 performs signal processing to extract signals corresponding to burst data within servo data, which are required for a servo process such as head positioning control.

The channel circuit 8 reproduces the data, which are then forwarded to a servo process circuit 9. The servo process circuit 9 executes signal processing required for the servo process with respect to the reproduced data. Herein, the servo process circuit 9 has three functions, i.e., a timing generation function, a decode function and an A/D conversion function. In the timing generation function, the servo process circuit 9 generates a variety of timing signals based on the reproduced data, wherein one example of the timing signal corresponds to "servo gate" which is made valid only in a duration corresponding to a servo region. In the decode function, the servo process circuit 9 extracts and decodes cylinder codes within servo data recorded on the servo region. In the A/D conversion function, the servo process circuit 9 performs analog-to-digital conversion on signals corresponding to the burst data, which are extracted from the servo data by the channel circuit 8. Then, the burst data are forwarded to a CPU 10. For example, the servo process circuit 9 is configured by a gate array (GA).

The CPU 10 is configured by a one-chip microprocessor, for example. The CPU 10 controls internal parts of the magnetic disk drive 100 in accordance with control programs stored in a ROM 11, thus performing the known controls. Specifically, the CPU 10 operates the motor driver 6 to drive and control the voice coil motor 5 in accordance with the burst data, which are extracted from the servo data by the servo process circuit 9. Thus, the CPU 10 is capable of performing seek positioning control to move the magnetic head 2 to a target position on the magnetic disk 1. In addition, the CPU 10 controls a hard disk controller (i.e., HDC) 14 to perform transfer control with respect to recording data and reproduced data. Further, when a defect sector is detected at a record mode or a reproduction mode for the magnetic disk 1, the CPU 10 requests a host machine 17 to transfer video recording reservation condition data, based on which it makes a decision as to whether a reassignment process should be performed or not. Furthermore, based on a time reading value from a timer 20, the CPU 10 makes a decision as to whether calibration should be immediately performed or not. The CPU 10 is connected with the ROM (i.e., Read-Only Memory) 11 as well as a RAM (i.e., Random-Access Memory) 12. Herein, the ROM 11 stores the control programs, based on which the CPU 10 control the internal parts of the magnetic disk drive 100. The RAM 12 provides the CPU 10 with a work area as well as storage areas for storing control programs being used by the CPU 10.

The CPU 10 is also connected with a rewritable nonvolatile memory, i.e., an EEPROM (Electrically Erasable and Programmable Read-Only Memory) which is used to store control parameters for the magnetic disk drive 100, as well as the hard disk controller (HDC) 14.

The hard disk controller 14 controls communications of commands and data with respect to the host machine 17. In addition, the hard disk controller 14 controls communications of data with respect to the magnetic disk 1 by way of the channel circuit 8. The hard disk controller 14 stores the recording data and reproduced data in a cash system. The hard disk controller 14 is equipped with a buffer memory (or buffer RAM) 15, which is configured by a RAM or else. In addition, the hard disk controller 14 is connected to a host interface 16, which acts as an interface between the hard disk controller 14 and the host machine 17. So, communications of commands and data are performed between the hard disk controller 14 and the host machine 17 by way of the host interface 16.

The host machine 17 is connected with a tuner 18b equipped with an antenna 18a, a monitor 19, a timer 20 and an operation panel 21. Herein, the antenna 18a receives television signals as a source of signals corresponding to video recording data, while the tuner 18b performs tuning on the television signals to output video signals. The monitor 19 displays video images corresponding to the video signals.

As described above, the present embodiment adopts the television signals as the source of the video recording data. However, it is possible to employ other vide signals, which are read from optical disks or else. In addition, it is possible to provide multiple tuners instead of the single tuner 18b.

The host machine 17 is capable of performing picture compression, by which the video signals are digitized and are compressed to reduce an amount of information per unit time. Or, it performs a compression process by which digitized video signals being transmitted thereto are compressed to reduce an amount of information per unit time. The host machine 17 also has a data processing function, by which "necessary" data are extracted from digital signals, for example. Thus, the host machine 17 is capable of producing video recording data.

The host machine 17 has data transmission-reception functions with respect to the magnetic disk drive 100. That is, the host machine 17 transmits the video recording data to the magnetic disk drive 100 by way of the host interface 16, so that the video recording data are recorded on the magnetic disk 1. In addition, the host machine 17 receives video data being recorded on the magnetic disk 1 from the magnetic disk drive 100, so that the monitor 19 displays video images corresponding to the video data on a screen.

Further, the host machine 17 has some recording functions with respect to the magnetic disk 1. That is, the host machine 17 controls the magnetic disk drive 100 to record video recording data, corresponding to at least one program presently being broadcast, on the magnetic disk 1. In addition, the host machine 17 controls the magnetic disk drive 100 to perform reserved video recording with respect to at least one broadcast program, which will be broadcast at a certain time being designated by the timer 20 by reservation. Incidentally, the host machine 17 incorporates a RAM (not shown), which stores reserved video recording conditions with regard to the reserved program and reservation time.

As described before, the host machine 17 is connected with the CPU 10 of the magnetic disk drive 100 by way of the host interface 16. So, the CPU 10 is capable of obtaining the reserved video recording condition stored in the RAM of the host machine 17 as well as data representing the time set to the timer 20.

A user operates switches and controls of the operation panel 21 to enable the foregoing functions of the host machine 17, i.e., selection of the received program (i.e., tuning), extraction of the necessary data by digital signal processing and setting of program recording reservation, for example.

Next, a description will be given with respect to operations of the video recording/reproduction system of FIG. 1 with reference to flowcharts shown in FIGS. 2 to 5.

Figure 2:
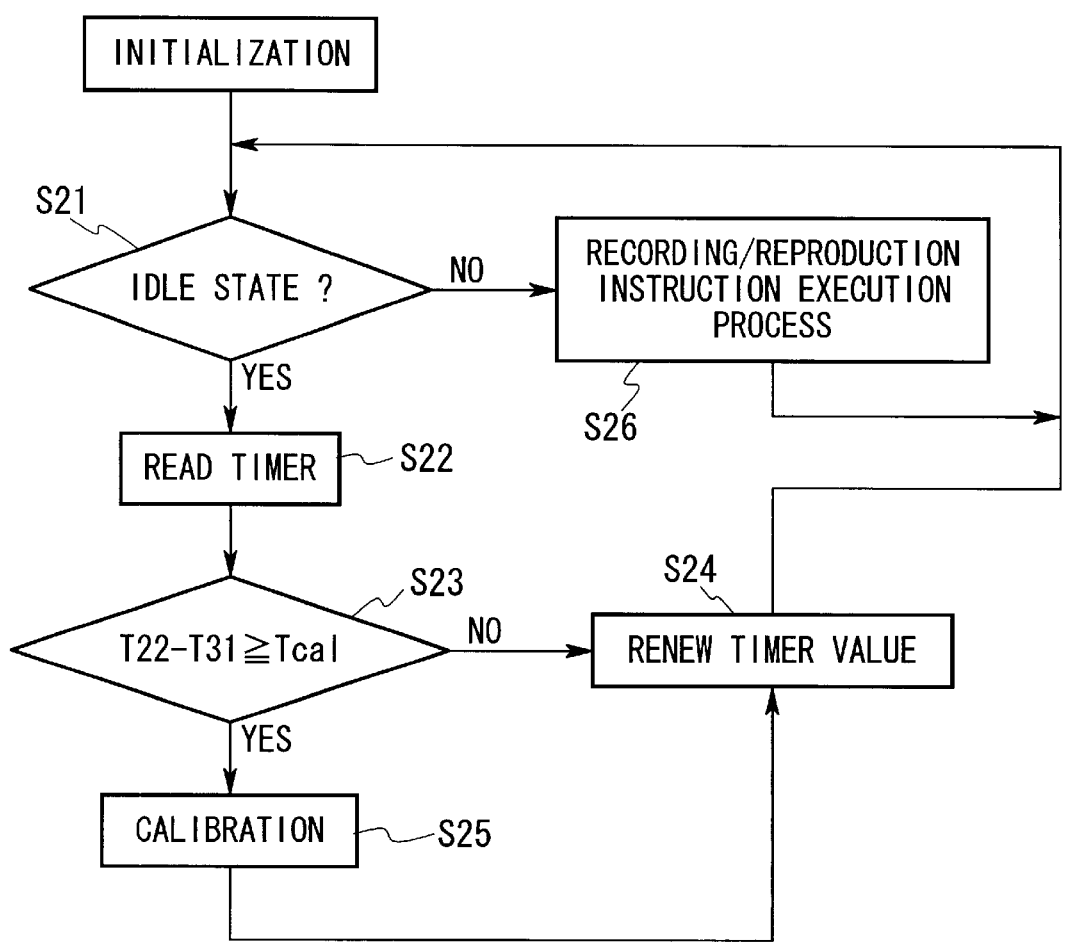
FIG. 2 is a flowchart showing an overall operation of the video recording/reproduction system.

FIG. 2 is a flowchart showing an overall operation of the magnetic disk drive 100, which executes a reassignment process and calibration.

Figure 3:
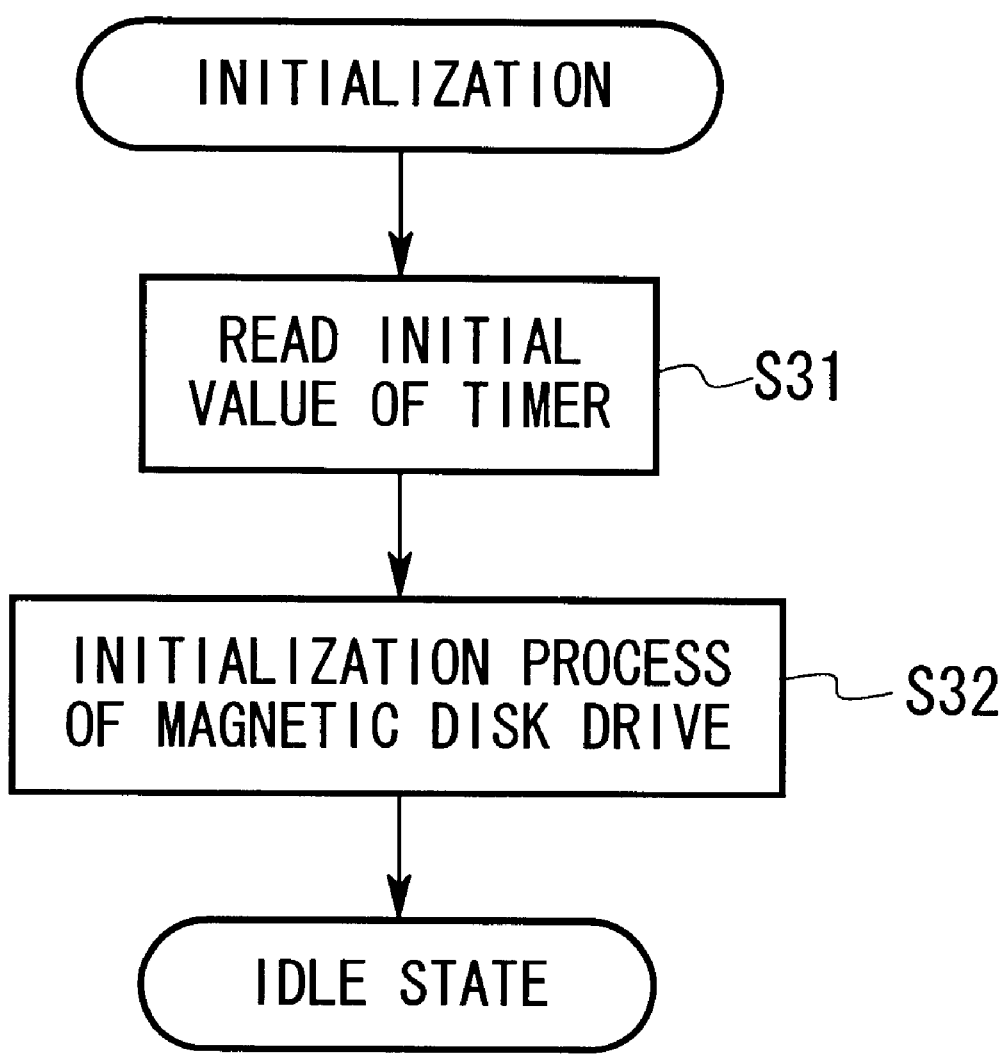
FIG. 3 is a flowchart showing an initialization process, which is started when electric power is applied to the magnetic disk drive.

The flowchart of FIG. 2 is started by "initialization (or initial setting)", content of which will be described with reference to FIG. 3. When electric power is applied to the magnetic disk drive 100, the CPU 10 starts to read time of the timer 20, connected to the host machine 17, by way of the hard disk controller 14 and the host interface 16 in step S31. In step S32, the CPU 10 performs an initialization process on the internal parts of the magnetic disk drive 100. Then, the CPU 10 proceeds to an idle routine for waiting for commands being given from the host machine 17. The read time is a reference time used for determination of intervals of time, by which the calibration is to be started.

In the aforementioned initialization process, the CPU 10 performs processes to record tables of the defect information 1a, 1b, recorded on the magnetic disk 1, to the RAM 12 or else. Thereafter, the CPU 10 transfers control to step S21 shown in FIG. 2, in which it makes a decision as to whether the magnetic disk drive 100 is placed in an idle state or not. If the CPU 10 determines that the magnetic disk drive 100 is not placed in the idle state, the CPU 10 transfers control to step S26 of a recording/reproduction instruction execution process. Herein, the CPU 10 receives instructions from the host machine 17 to perform a magnetic disk control process, e.g., recording/reproduction processes of the magnetic disk 1.

Next, the reassignment process will be described with reference to FIG. 4, which is related to the recording/reproduction instruction execution process of the step S26 shown in FIG. 2. For convenience' sake, the following description is made such that recording and reproduction, each of which should be performed independently, are expressed collectively by a single term of "recording/reproduction".

Suppose that in the idle state, the host machine 17 presently issues recording/reproduction instructions to the magnetic disk drive 100. The recording/reproduction instructions are transferred to the CPU 10 by way of the host interface 16 and the hard disk controller 14.

Figure 4:
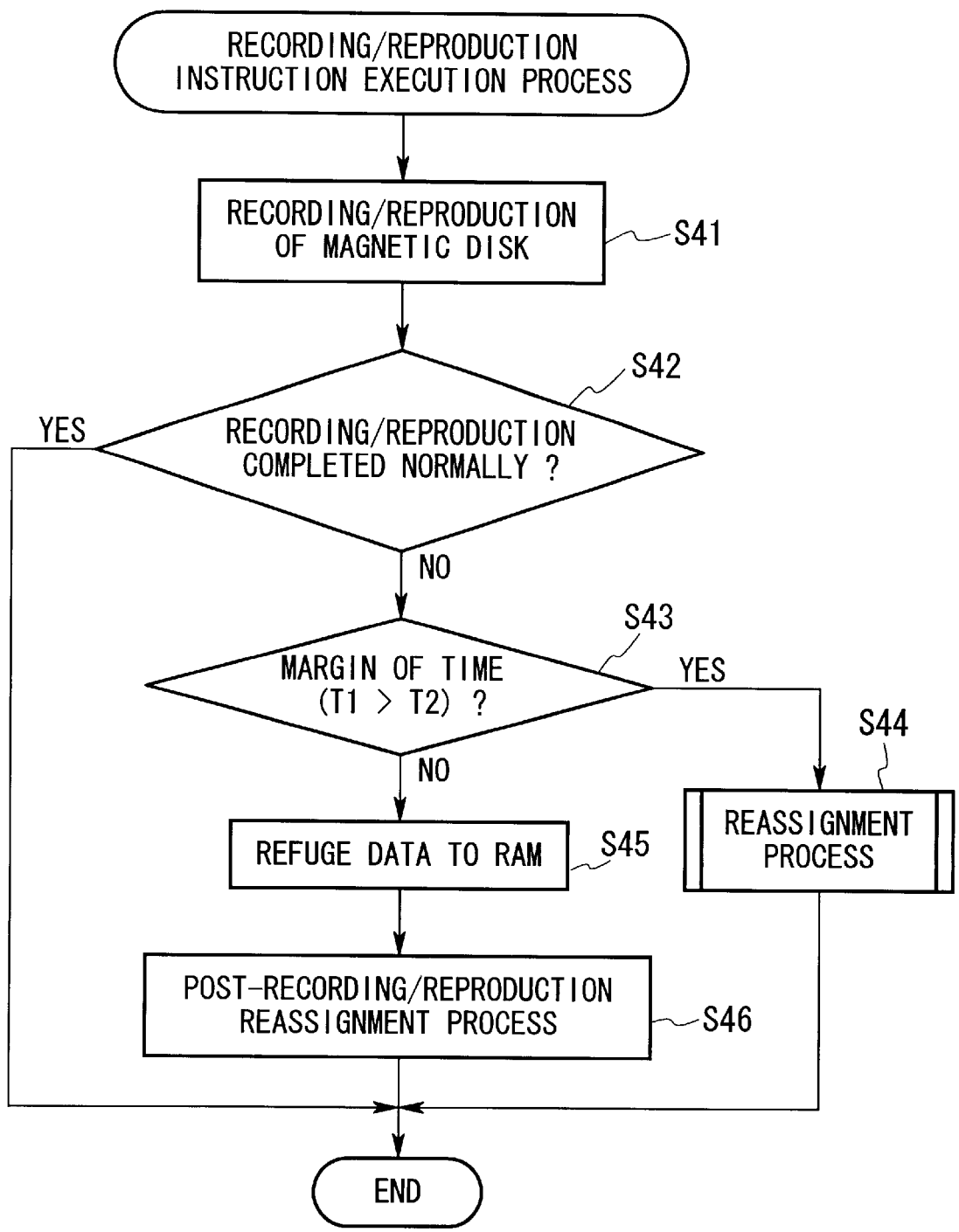
FIG. 4 is a flowchart showing a recording/reproduction instruction execution process in which a reassignment process is performed.
Figure 5:
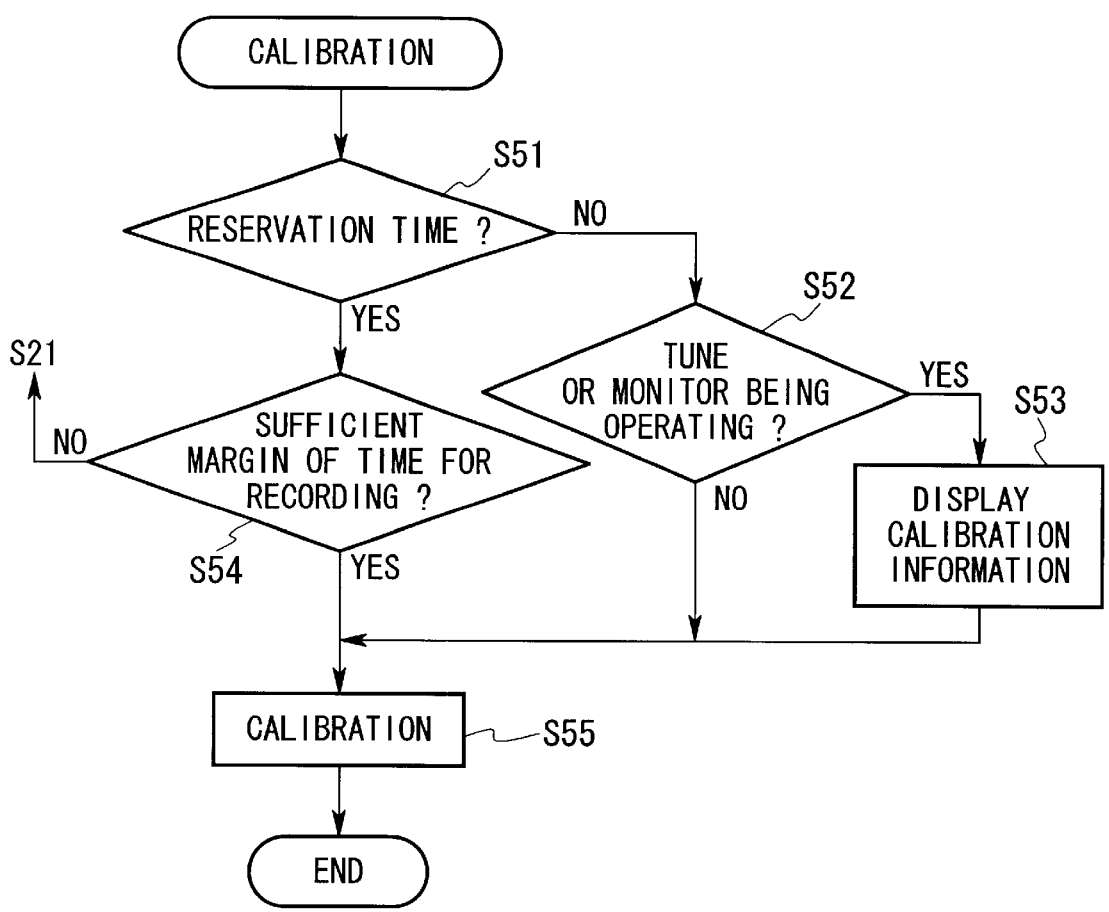
FIG. 5 is a flowchart showing a calibration process.

Upon receipt of the recording/reproduction instructions from the host machine 17, the CPU 10 transfers control to step S41 shown in FIG. 4. Herein, the CPU 10 controls the motor driver 6 to drive the voice coil motor 5, so that the magnetic head 2 is subjected to positioning toward a target position on the magnetic disk 1. Thus, the CPU 10 controls the channel circuit 8 and the head amplifier circuit 7 to perform recording/reproduction operations with respect to a target sector under the condition where the magnetic head 2 is at the target position on the magnetic disk 1.

If the circuits fail to achieve the recording/reproduction operations normally with respect to the target sector, the CPU controls the circuits again to retry the operations. If the CPU 10 do not succeed access to the target sector of the magnetic disk 1 by repeating the operations a predetermined number of times, it transfers control from step S42 to step S43. In step S43, the CPU 10 makes a decision with respect to a transfer speed margin degree. The transfer speed margin degree is determined by calculating a time T1, as follows:

For example, a transfer speed of recording/reproduction data presently instructed is subtracted from a maximum transfer speed of the magnetic disk drive 100. Then, the time T1 is produced by dividing a vacant capacity of the buffer memory 15 by a difference between the transfer speeds.

If the calculated time T1 is greater than a time T2 which is required for the reassignment process, the CPU 10 determines that the target sector corresponds to a defect sector. So, the CPU 10 proceeds to step S44 to perform the reassignment process. In the reassignment process, the CPU 10 selects an alternate destination sector from among alternate sectors which remain at a present time, so that the CPU 10 assigns the selected sector as a new target sector. As described before, the defect information 1a, 1b store the alternate sector using condition table and alternate destination assignment condition table. So, it is possible to determine the alternate destination (sector) with reference to the alternate sector using condition table. In addition, with reference to the alternate destination assignment condition table, it is possible to make a decision as to whether the CPU 10 should access the alternate sector or not because the presently subjecting sector is the defect sector. In order to enable high-speed access of the CPU 10, the RAM 12 loads information of the tables in advance by the aforementioned initialization process (see step S32), so that the CPU 10 is capable of speedily referring to the tables.

If the time T1 is not greater than the time T2, in other words, if data being transferred from the host machine 17 during execution of the reassignment process overflow the buffer memory 15, the CPU 10 transfers control from step S43 to step S45. Herein, the CPU 10 does not perform the reassignment process to record or reproduce data on the alternate sector. Instead, the CPU 10 temporarily refuges recording data, to be recorded on the alternate sector, to the RAM 12. In this case, the recording data and information representing an alternate destination sector are simultaneously stored in the RAM 12. Next, the CPU 10 proceeds to step S46 to perform a post-recording/reproduction reassignment process. That is, after completion of the recording/reproduction instructions, the CPU 10 reads the recording date from the RAM 12, so that the recording data are recorded on the alternate destination sector of the magnetic disk 1.

In FIG. 2, if the CPU 10 determines that the magnetic disk drive 100 is placed in the idle state, the CPU 10 transfers control from step S21 to step S22. In step S22, the CPU 10 reads time of the timer 20, connected to the host machine 17, by way of the hard disk controller 14 and the host interface 16. Herein, the CPU 10 obtains time T22 in step S22, while it obtains time T33 in step S31 shown in FIG. 3 at which electric power is applied to the magnetic disk drive 100. A difference between the times T22 and T31 is set as an interval of time for the calibration in advance. In step S23, the difference between the times T22 and T31 is compared with a prescribed time Tcal, which is determined in advance. If the difference between the times T22 and T31 is smaller than the prescribed time Tcal, the CPU 10 proceeds to step S24, wherein it renews a timer value from T31 to T22. Then, the CPU 10 reverts control to the foregoing step S21. In short, in the aforementioned step S23 regarding comparison using Tcal, the CPU 10 compares the time read from the timer 20 at the step S22 with another previous time, which is read from the timer 20 in a previous cycle.

If the difference between T22 and T31 becomes equal to Tcal or more, the CPU 10 proceeds to step S25, in which it performs a calibration process. Now, the calibration process will be described in detail with reference to FIG. 5. The calibration process is executed by a calibration routine of FIG. 5. In step S51, the CPU 10 checks reserved recording information stored in the host machine 17 by way of the hard disk controller 14 and the host interface 16, thus making a decision as to whether a present time of the timer 20 corresponds to a reservation time or not. Herein, the reservation time is defined by a start time and an end time, which are designated by the user for reservation of some broadcast program.

If the present time of the timer 20 does not correspond to the reservation time, the CPU 10 transfers control to step 52, in which it checks an operating state of the tuner 18b or the monitor 19. In other words, the CPU 10 makes a decision as to whether the user presently watches some broadcast program or not. If the tuner 18b or the monitor 19 is presently operating, it may be necessary to immediately record video data (and audio data) with regard to the broadcast program which the user presently watches. Therefore, there is a possibility in which the user operates some switch(es) and control(s) on the operation panel 21 to issue a recording instruction to the host machine 17. So, if the tuner 18b or the monitor 19 is presently operating, the CPU 10 informs the user of information that the calibration is to be performed. Thus, in step S53, the CPU 10 displays such information on the screen of the monitor 19 or on the operation panel 21. In contrast, if the tuner 18b or the monitor 19 is not presently operating, the CPU 10 determines that the user does not presently watch the broadcast program, so that the CPU 10 starts to perform the calibration in step S55.

If the present time corresponds to the reservation time, the CPU 10 transfers control to step S54 from step S51. Herein, the CPU 10 refers to a time difference between the start time of reservation and a read value of the timer 20 at the foregoing step S22. The CPU 10 compares such a time difference with a calibration time, which is required for the calibration and which is some seconds or so. To increase the time difference, it is possible to incorporate an additional time, which is calculated as follows:

For example, a transfer speed of data regarding the reservation is subtracted from the maximum transfer speed of the magnetic disk drive 100. Then, a difference between the transfer speeds is divided by the vacant capacity of the buffer memory 15 to produce the additional time.

If a comparison result shows that the time difference is greater than the calibration time, in other words, there remains a margin of time to allow the calibration to be performed, the CPU 10 determines to perform the calibration. In contrast, if the time difference is under the calibration time, in other words, if the recording cannot be performed at the reservation time due to the calibration, the CPU 10 determines not to perform the calibration, so that the CPU 10 reverts control to the foregoing step S21.

The present embodiment is related to some examples of calibrations, as follows:
  i) Disk eccentric calibration;
  ii) Calibration (current/acceleration reduced gain) of the voice coil motor (VCM) control system that drives the head arm to be placed at the prescribed position; and
  iii) Calibration, being accompanied with time variations (or temperature variations), against external forces such as the wind pressure applied to the head arm or flexible printed-circuit board (FPC).

Control programs for executing the above calibrations are stored in the ROM 11, while parameters are set to the EEPROM 13 such that they can be rewritten. In addition, it is possible to change a priority order in execution of the calibrations in consideration of states of the parameters being changed. After completion of the calibration(s), the CPU 10 renews a timer value in step S24 (see FIG. 2). Then, the CPU 10 reverts control to the foregoing step S21.

As described heretofore, the present embodiment of the invention is characterized by providing two steps as follows:

i) A first step is concerned with the reassignment process of the magnetic disk drive and is made by comparison between the maximum transfer speed of the magnetic disk drive, data transfer speed of the recording/reproduction signals (or data) and capacity of the buffer memory. Based on the comparison result, a decision is made as to whether the reassignment process is performed or not, or a decision is made as to whether the reassignment process is performed after the CPU refuges data to the RAM or not.

ii) A second step is concerned with the calibration and is made based on a timer value being read from the timer. Herein, a decision is made as to whether there remains a margin of time corresponding to the calibration time before the start time of reserved recording. If there remains such a margin of time, the CPU determines to perform the calibration.

Because of provision of the aforementioned steps, the present embodiment of the invention is capable of offering two effects as follows:

i) A first effect is to suppress reduction of the transfer speed due to break(s) of data transfer between the magnetic disk drive and host machine during the recording or reproduction. In short, it is possible to suppress reduction of throughput of video data. Thus, it is possible to improve reliability of the magnetic disk drive without deterioration of picture quality in recording and reproduction. This is achieved by provision of the first step in which a decision is made as to whether the reassignment process is performed or not by comparing the difference between the maximum transfer speed and data transfer speed in recording or reproduction with the vacant capacity of the buffer memory.

ii) A second effect is to avoid occurrence of a problem in which video images are interrupted intermittently because the recording is not started immediately at an arbitrary time at which the user wishes to start video recording when watching the video (or broadcast program). This is achieved by provision of the second step in which a decision is made as to whether there remains a margin of time corresponding to the calibration time before the start time of reserved recording or not on the basis of the time being read from the timer. So, the calibration is performed under the condition where there remains such a margin of time. In addition, the user is capable of recognizing the calibration in progress by display.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. In a magnetic disk drive which drives a magnetic head to record or reproduce video information at a predetermined position on a magnetic disk in response to a command being given from a host machine, said magnetic disk drive comprising:

reassignment process decision means for if a defect sector appears on the magnetic disk, making a decision as to whether a reassignment process, in which data to be recorded on the defect sector is assigned to and recorded on an alternate sector, is performed immediately or not; and calibration decision means for making a decision, based on time information being read from the host machine, as to whether a calibration is performed or not, wherein a time margin is calculated with reference to capacity of a buffer memory, a maximum transfer speed and a data transfer speed by which recording signals are transferred onto the magnetic disk, so that the reassignment process decision means makes the decision whether to perform the reassignment process immediately by comparing the time margin with a time required for execution of the reassignment process.

2. A magnetic disk drive according to claim 1, which is provided as a video recording device for a video recording/reproduction system incorporating the host machine, which is equipped with an antenna for receiving broadcasting waves representing broadcast programs on the air, a tuner, connected to the antenna, for selecting a desired broadcast program by tuning so as to provide video data, a monitor for displaying pictures on a screen, a timer for measuring time, and an operation panel, which is manipulated to perform selection, recording, reproduction and data processing corresponding to compression with respect to the video data.

3. In a magnetic disk drive which drives a magnetic head to record or reproduce video information at a predetermined position on a magnetic disk in response to a command being given from a host machine, said magnetic disk drive comprising:

reassignment process decision means for if a defect sector appears on the magnetic disk, making a decision as to whether a reassignment process, in which data to be recorded on the defect sector is assigned to and recorded on an alternate sector, is performed immediately or not; and calibration decision means for making a decision, based on time information being read from the host machine, as to whether a calibration is performed or not, wherein the calibration decision means comprises time detection means for detecting a lapse of time to perform calibration by successively reading time of a timer being connected to the host machine at initialization of the magnetic disk, and time difference detection means for calculating a time difference between a reservation time stored in the host machine and a present time, whereby the decision whether to perform the calibration is made by comparison between the time difference and calibration time required for execution of the calibration.

4. A magnetic disk drive according to claim 3, which is provided as a video recording device for a video recording/reproduction system incorporating the host machine, which is equipped with an antenna for receiving broadcasting waves representing broadcast programs on the air, a tuner, connected to the antenna, for selecting a desired broadcast program by tuning so as to provide video data, a monitor for displaying pictures on a screen, a timer for measuring time, and a operation panel, which is manipulated to perform selection, recording, reproduction and data processing corresponding to compression with respect to the video data.

5. A video recording/reproduction system comprising:
   a magnetic disk drive for performing recording and reproduction of video data on a magnetic disk by driving a magnetic head, wherein the magnetic disk drive is controlled by a CPU in accordance with control programs in association with a buffer memory;
   a host machine for controlling the magnetic disk drive in accordance with commands being input from an operation panel which is manipulated by a human operator;
   a tuner, equipped with an antenna, for selecting a desired broadcast program being broadcast on the air;
   a monitor; and
   a timer for measuring time,
   whereby at a recording mode, the host machine controls the magnetic disk drive to record the broadcast program on the magnetic disk, while at a reproduction mode, the host machine controls the magnetic disk drive to reproduce data from the magnetic disk so that the monitor displays pictures corresponding to the reproduced data on a screen,
   wherein at an access failure state where the magnetic head fails to access a target sector on the magnetic disk, the magnetic disk drive performs a reassignment process so that an alternate sector is assigned as alternate destination for the target sector to perform recording or reproduction, and wherein a decision whether to perform the reassignment process is made based on a maximum transfer speed of the magnetic disk drive, a data transfer speed by which data being recorded or reproduced is to be transferred between the magnetic disk drive and the host machine and vacant capacity of the buffer memory as well as a time required for execution of the reassignment process.

6. A video recording/reproduction system according to claim 5 wherein the vacant capacity of the buffer memory is divided by a difference between the maximum transfer speed and the data transfer speed so as to produce a first time, which is compared with a second time required for execution of the reassignment process to make the decision in such a way that the magnetic disk drive proceeds to the reassignment process if the first time is greater than the second time.

7. A video recording/reproduction system according to claim 6 wherein if the first time is under the second time so that data transferred from the host machine overflows the buffer memory by execution of the reassignment process, the magnetic disk drive determines not to perform the reassignment process but to temporarily refuge the data to be recorded on the alternate sector in a storage thereof.

8. A video recording/reproduction system according to claim 7 wherein after completion of the recording or reproduction, the magnetic disk drive reads the data from the storage so that the data are recorded on the alternate sector of the magnetic disk.

9. A video recording/reproduction system according to claim 5 wherein the magnetic disk drive stores an alternate sector using condition table for storing a plurality of alternate sectors which are selected in advance and each of which is assigned as alternate destination for the defect sector, as well as an alternate destination assignment condition table for storing relationship between position information of the defect sector and position information of the alternate sector being assigned, so that in the reassignment process, the alternate destination is determined with reference to the alternate sector using condition table, while a decision whether to access the alternate sector because the target sector corresponds to the defect sector is made with reference to the alternate destination assignment condition table.

10. A video recording/reproduction system comprising:
   a magnetic disk drive for performing recording and reproduction of video data on a magnetic disk by driving a magnetic head, wherein the magnetic disk drive is controlled by a CPU in accordance with control programs in association with a buffer memory;
   a host machine for controlling the magnetic disk drive in accordance with commands being input from an operation panel which is manipulated by a human operator;
   a tuner, equipped with an antenna, for selecting a desired broadcast program being broadcast on the air;
   a monitor; and
   a timer for measuring time,
   whereby at a recording mode, the host machine controls the magnetic disk drive to record the broadcast program on the magnetic disk, while at a reproduction mode, the host machine controls the magnetic disk drive to reproduce data from the magnetic disk so that the monitor displays pictures corresponding to the reproduced data on a screen,
   wherein the magnetic disk drive performs calibration with respect to the magnetic disk only when a time margin between a present time measured by the timer and a start time of reserved recording in which the host machine stores a reservation time for recording of a broadcast program on the magnetic disk is greater than a calibration time required for execution of the calibration.

* * * * *